(12) United States Patent
Fenton

(10) Patent No.: US 6,445,697 B1
(45) Date of Patent: Sep. 3, 2002

(54) AUDIO CODEC RESELECTION FOR INCREASED PORT DENSITY

(75) Inventor: James L. Fenton, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/161,111

(22) Filed: Sep. 25, 1998

(51) Int. Cl.$^7$ .................................................. H04J 3/06
(52) U.S. Cl. ........................ 370/357; 370/352; 370/401; 370/465
(58) Field of Search ................................. 370/351, 352, 370/353, 354, 355, 356, 357, 401, 431, 437, 442, 463, 464, 465, 468, 477; 709/104, 226

(56) References Cited

U.S. PATENT DOCUMENTS

| | | | | |
|---|---|---|---|---|
| 5,349,579 A | * | 9/1994 | Madonna et al. | 370/352 |
| 5,440,740 A | * | 8/1995 | Chen et al. | 709/104 |
| 5,483,530 A | * | 1/1996 | Davis et al. | 370/352 |
| 5,497,373 A | * | 3/1996 | Hulen et al. | 370/431 |
| 5,604,740 A | * | 2/1997 | Pinault et al. | 370/463 |
| 5,842,014 A | * | 11/1998 | Brooks et al. | 370/425 |
| 5,949,762 A | * | 9/1999 | Green et al. | 370/259 |
| 6,104,721 A | * | 8/2000 | Hsu | 370/431 |
| 6,240,084 B1 | * | 5/2001 | Oran et al. | 370/352 |
| 6,269,095 B1 | * | 7/2001 | Neubauer et al. | 370/352 |

FOREIGN PATENT DOCUMENTS

GB        2315190     *  1/1998

OTHER PUBLICATIONS

Cassing, C6X Solutions for Voice Over IP Gateway, IEEE, pp. 74–85, Aug. 1998.*
Morgan, Voice Over Packet, White Paper, Telogy Networks, pp. 1–13, 1997.*
Evans et al., Adative Voice/Data Networks, University of Kansas, pp. 1–40, Jul. 11, 1994.*

* cited by examiner

Primary Examiner—Wellington Chin
Assistant Examiner—Frank Duong
(74) Attorney, Agent, or Firm—Marger Johnson & McCollom, PC

(57) ABSTRACT

An Internet telephony gateway and method for operating a gateway are disclosed. The gateway is designed with a port to support a predefined maximum number of audio data channels. The gateway contains sufficient processing throughput to operate a first, high quality audio codec on a subset of the channels. However, this throughput is sufficient to operate a second, lower quality audio codec on a greater number of the channels, preferably all of them. The first and second codecs are designed to produce compressed audio data streams that are interoperably decompressable.

In operation, the gateway host processor assigns new calls to either the first or second codec, depending on the current traffic being handled by the gateway. If new calls would result in the gateway's processing throughput being exceeded, the host processor may reassign a channel from the first codec to the second codec in order to create processing headroom for the addition of a new channel. Because the codecs are interoperably decompressable, no renegotiation need occur with the far end of the communication channel when a codec is reassigned. This gateway offers the potential for high-quality communication over the maximum number of channels possible, with a natural degradation as the gateway reaches its full channel capacity, using modest processing resources.

24 Claims, 3 Drawing Sheets

FIG. 3
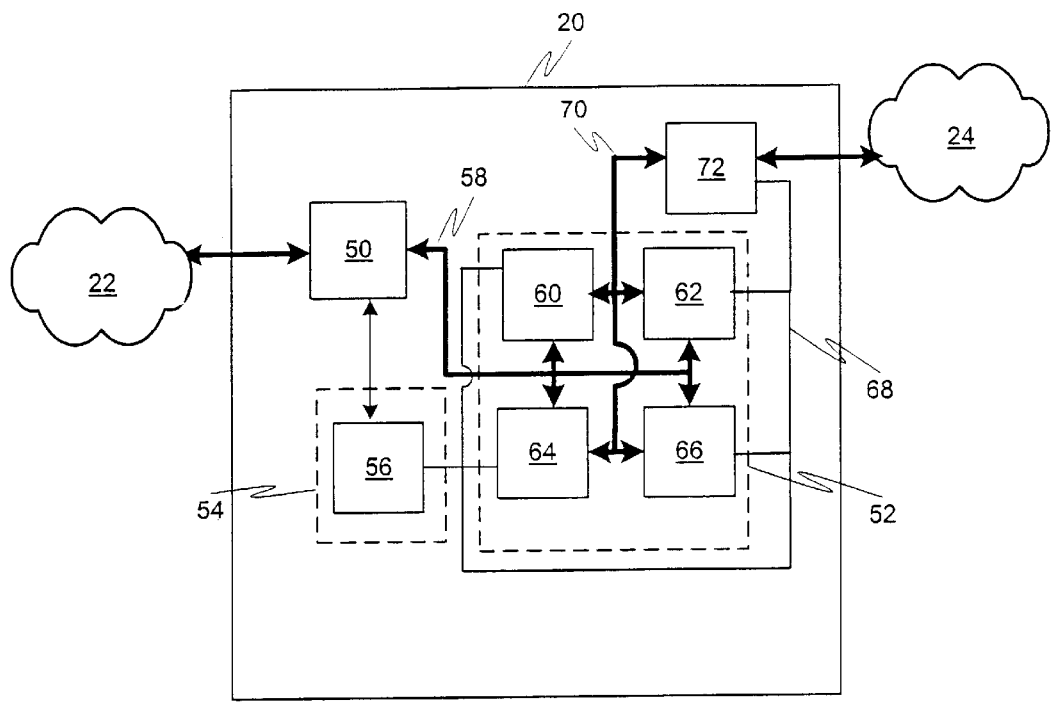
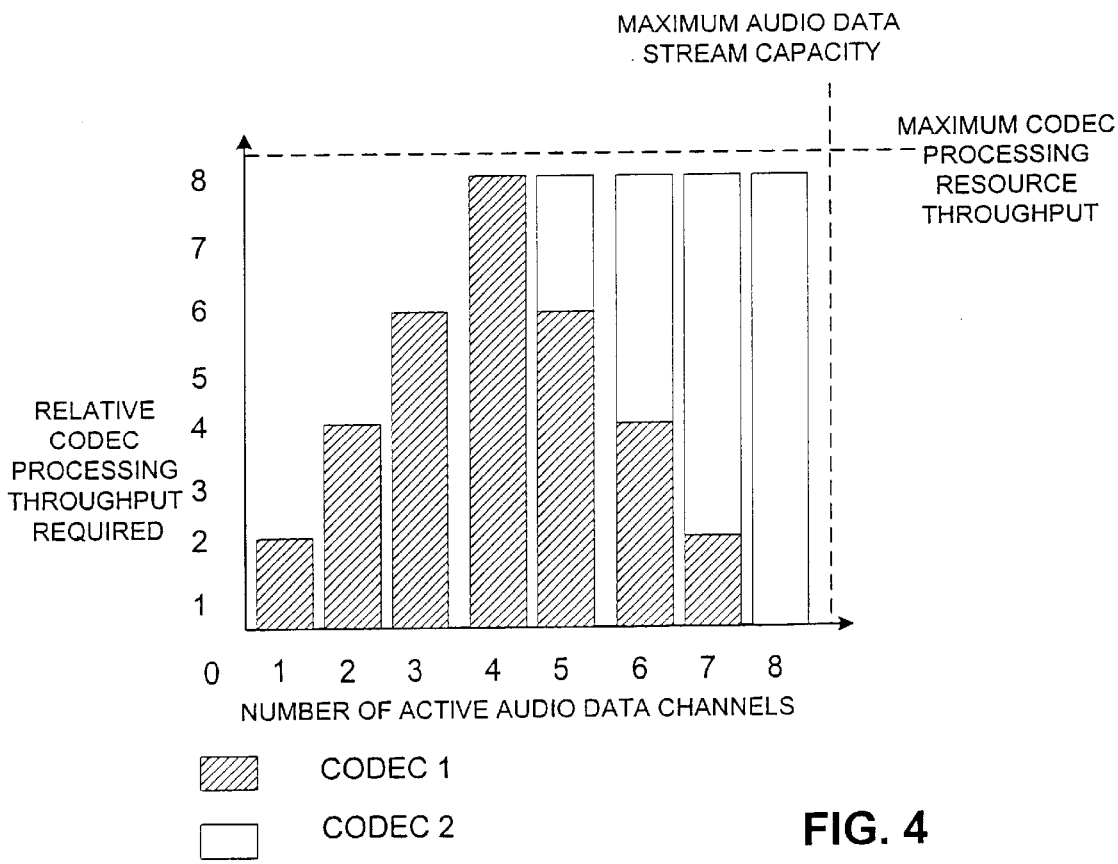
FIG. 4

| | AUDIO DATA CHANNELS | CALL ADD/DROP EVENTS | | | | | | | |
|---|---|---|---|---|---|---|---|---|---|
| | | T0 | T1 | T2 | T3 | T4 | T5 | T6 | T7 |
| CODEC VECTOR | 1 | X | 1 | 1 | 2 | 2 | X | X | 1 |
| | 2 | X | X | 1 | 1 | 2 | 2 | X | X |
| | 3 | X | X | X | 2 | 2 | 2 | 2 | 2 |
| | 4 | X | X | X | X | 2 | 2 | 2 | 2 |

FIG. 5

| | AUDIO DATA CHANNELS | CALL ADD/DROP EVENTS | | | | | | | |
|---|---|---|---|---|---|---|---|---|---|
| | | T0 | T1 | T2 | T3 | T4 | T5 | T6 | T7 |
| CODEC VECTOR | 1 | X | 1 | 1 | 2 | 2 | X | X | 2 |
| | 2 | X | X | 1 | 1 | 2 | 2 | X | X |
| | 3 | X | X | X | 2 | 2 | 1 | 1 | 2 |
| | 4 | X | X | X | X | 2 | 2 | 1 | 1 |

FIG. 6

AUDIO CODEC RESELECTION FOR INCREASED PORT DENSITY

FIELD OF THE INVENTION

This invention pertains generally to methods and systems for communication of audio signals between a circuit-switched telephone network and a packet-switched data network, and more particularly to methods and systems for compressing and decompressing multiple audio data streams for packet-switched transmission.

BACKGROUND OF THE INVENTION

Traditional telephone networks are circuit-switched. A circuit-switched network establishes a continuously transmitting connection between persons at both ends Qf a phone conversation. This type of connection generally requires that one network circuit be dedicated to each conversation for its entire duration. The network circuit typically comprises an analog phone wire, a time slot on a time-division-multiplexed (TDM) digital wire, satellite, or microwave transmission, or some combination of these technologies. Although during the course of a telephone conversation it is possible for a connection to be re-routed, generally some network path between connection endpoints remains open throughout.

In contrast, most data networks are packet-switched. A packet-switched network communicates data in small chunks, or "packets", which require no dedicated circuit. Each packet contains an address that allows the data network to route it to the appropriate destination. Packets travel across a network much as cars travel on a highway system—each packet must merge with and share the road with competing traffic. Packet switches operate like highway interchanges, allowing packets orderly network ingress and egress.

It is now possible to route voice telephone traffic over data networks through a technique commonly referred to as "Voice Over IP", or "VoIP" for short. VoIP can require significantly less average bandwidth than a traditional circuit-switched connection for several reasons. First, by detecting when voice activity is present, VoIP can choose to send little or no data when a speaker on one end of a conversation is silent, whereas a circuit-switched connection continues to transmit during periods of silence. Second, the digital audio bitstream utilized by VoIP may be significantly compressed before transmission using a codec (compression/decompression) scheme. Using current technology, a telephone conversation that would require two 64 kbps (one each way) channels over a circuit-switched network may utilize a data rate of roughly 8 kbps with VoIP.

One limitation of VoIP is the requirement that both ends of the conversation be connected to the same packet-switched network. Two computer users running compatible software can establish voice communications if both of their computers are connected to the common packet-switched network (using IP, IPX, or another protocol) and one user knows how to reach the other. VoIP becomes much more attractive if both users need not sit at a computer, such that one or both parties to the conversation can use conventional phones. Hardware that allows conventional phones to communicate over the Internet (or an intranet) is known as an Internet telephony gateway.

Several Internet telephony gateways 20, 34, 36 are illustrated in FIG. 1. One side of such a gateway typically connects to a circuit-switched public telephone network 22, 38 or a private branch exchange 44. A gateway may be reached by dialing an appropriate phone number from any phone (e.g. 26, 28, 40, 42, 46) connected to 22, 38, or 44. The other side of an Internet telephony gateway connects to a packet-switched data network 24, which may be the Internet, an intranet, or a proprietary data network. Gateway 20 may conduct a VoIP session with a computer (e.g. 30, 32) running VoIP software and connected to data network 24, or with another gateway 34, 36.

Gateway 20 typically performs several functions. It may process fax or modem transmissions as well as voice data, or it may be dedicated to processing voice data only. For processing voice data, the gateway performs voice activity detection (VAD) on the audio signal it receives from phone network 22. Gateway 20 may perform echo cancellation on this signal. The gateway typically utilizes a codec to compress the incoming signal from phone network 22. The compressed signal is packetized and routed by gateway 20 for delivery over packet-switched network 24. For the audio packets received from packet-switched network 24, the gateway assembles the audio packets into a data stream, decompresses the data stream, and outputs the decompressed data stream onto phone network 22. Gateways also typically perform connection establishment, administrative, and statistics-gathering functions.

SUMMARY OF THE INVENTION

Most Internet telephony gateways offer the capability to handle multiple simultaneous connections to a circuit-switched phone network. Gateway providers have a significant interest in providing effective compression of audio signals from each circuit-switched connection in order to reduce the bandwidth requirements of their packet-based network connection. Unfortunately, codecs are computationally intensive, and require a tradeoff between gateway-supplied processing power and compression capability.

The present invention provides a gateway system that effectively manages this tradeoff. The system provides high quality but computationally intensive voice compression for each connection when the system is lightly loaded. At times when the system is heavily utilized, lower-quality, less computationally intensive compression is employed. However, the system preferably operates so as to provide high-quality compression to as many connections as possible at any given time. The system can thus offer both high voice quality and high port density with modest processing resources, by allowing selective degradation of voice quality on some ports during periods of heavy utilization.

One key feature of the present invention is the ability of a gateway to switch codecs mid-conversation for a given connection, without requiring the data network destination to re-initialize, renegotiate, acknowledge, or even know that the codec has been switched. This feature provides an instant compatibility advantage—the packet receiver need only recognize one compressed data format that is compatible with both a high-quality and a low-quality codec. This requires that the high-quality and lower-quality codecs provide interoperability, at least to the extent that both produce compressed data that is compatible with a common decompression process.

In accordance with the present invention, a packet-based network telephony gateway is disclosed. This gateway comprises a port capable of allowing communication between the gateway and a plurality of telephone circuits. This gateway also comprises a codec processing resource capable of performing real-time data compression on audio streams received from the telephone circuits, using a codec selected from a set of codecs.

The codec processing resource preferably provides only enough processing throughput to allow the first codec to be used with a subset of the telephone circuits that can be connected through the port. The first codec and at least one alternate codec produce interoperably decompressable data streams.

The gateway further comprises a host processing resource that monitors telephone traffic density passing through the gateway and signals the codec processing resource to shift selected audio streams between codecs in the codec set that produce interoperably decompressable data streams; preferably, codec shifting is done to provide the best audio quality possible for the current traffic density.

In accordance with the present invention, a method of operating a packet-based network telephony gateway is disclosed that simultaneously handles a plurality of voice calls. This method monitors the number of calls presently being handled by the gateway. As calls are added or dropped from the gateway, a codec is dynamically selected, from a set of interoperably decompressable codecs, for each current call. Preferably, a first codec from this set, one that least degrades audio quality, is selected for each call when call density is low. Selected calls are switched to a second codec from the set of codecs when call density will not allow all calls to be processed using the first codec. Preferably, calls may be switched back to the first codec as processing resources allow. Some selection criteria for choosing which calls are switched to an alternate codec include length of call, quality of service, the number of times each call has previously switched codecs, or presence of voice activity.

BRIEF DESCRIPTION OF THE DRAWING

The invention may be best understood by reading the disclosure with reference to the following figures:

FIG. 3, which depicts a block diagram of a multiprocessor multiple call handling data network telephony gateway;

FIG. 4, which contains a diagram plotting relative codec processing throughput vs. number of channels in use, and indicating one method of codec selection to meet throughput constraints;

FIG. 5, which illustrates the evolution of a codec selection vector as calls are added and dropped from a gateway using one codec reselection method; and FIG. 6, which illustrates a similar evolution for a second codec reselection method.

DETAILED DESCRIPTION OF THE PREFERRED EMBODIMENTS

The present invention generally applies to data network telephony gateways. However, this description will not detail the well-understood operation of such equipment as it relates to audio data stream routing, codec operation, and data packetization. Instead, the following description focuses on the operation and control of such equipment with codec reselection.

The following terms have the following meanings for purposes of this disclosure. An audio data stream is a sampled and digitized representation of sound, but excludes fax- and modem-generated audio-frequency signals that merely represent digital data. A codec is an algorithmic pair of functions for compressing a data stream and subsequently decompressing the compressed data stream. Codecs can be lossless (i.e., the original data stream can be recovered bit-for-bit) or lossy (i.e., some information in the original data stream is discarded, ideally in a minimally-detectable fashion, during compression).

Figure 1:
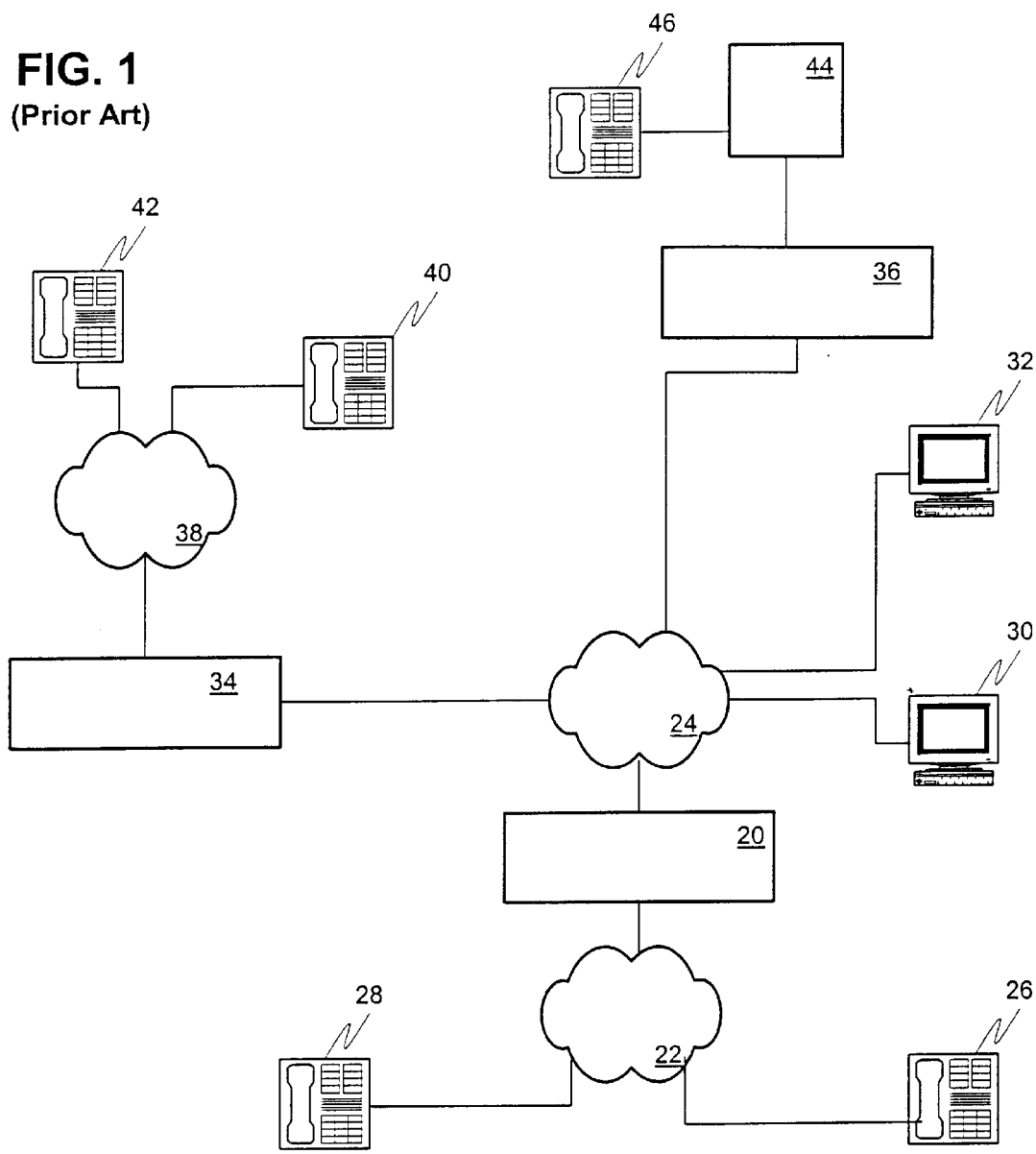
FIG. 1, which illustrates several gateways between telephone and data networks.
Figure 2:
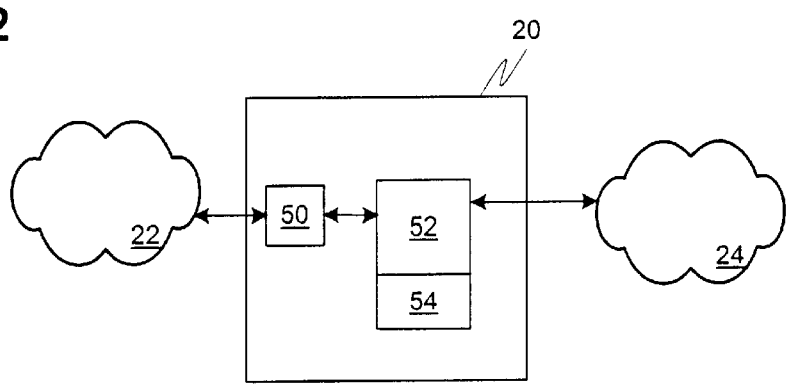
FIG. 2, which depicts a block diagram of a multiple call handling packet-based network telephony gateway.

FIG. 2 illustrates a data network telephony gateway 20 embodiment of the invention. Gateway 20 communicates with both a circuit-switched network 22 and a packet-switched network 24. Other hardware such as access concentrators, switches, packetizers, and routers may exist at the interfaces between gateway 20 and networks 22 and 24. The present invention need not disturb the operation of such interface equipment as commonly practiced in the art.

Gateway 20 contains a port 50 that passes audio data streams between circuit-switched network 22 and gateway 20. The connection of this port to network 22 may be accomplished in many ways. The port can support multiple RJ-45 modular jacks, each connecting one analog phone circuit to gateway 20. Alternately, the port can support digital connections such as ISDN. Preferably, the port accepts TDM digital PCM data streams, such as may be supplied in a T1 (1.544 Mbps, 24 interleaved data streams) or E1 (2.048 Mbps, 30 interleaved data streams) format. Gateway 20 may also be part of a larger network interface system, in which case port 50 could simply be a connection to a system-wide data bus where audio data streams appear at the gateway boundary in a specialized format that differs from common circuit-switched network formats.

Host processing resource 54 manages the overall control of gateway 20. As gateway 20 may be required to handle fax and/or modem data streams as well as audio data streams, host processing resource 54 may be responsible for seeing that fax, modem, and audio data streams are processed or handed off appropriately. The host processing resource 54 is generally responsible for monitoring call status and controlling call processing. Call processing may include connection establishment, authorization, remote host lookup, negotiation with remote hosts, and parsing individual data streams to available processing resources.

In most gateway systems, a significant amount of processing power is allocated to codec execution—this allocation is referred to herein as the codec processing resource and shown in FIG. 2 as element 52. Functionally, the codec processing resource resides between port 50 and data-switched network 24 in order that it may perform compression on audio data streams received from circuit-switched network 22 and decompression on compressed audio data streams received from data-switched network 24. Generally, the same codec does not have to be used in both directions of travel for a two-way connection, although using the same codecs is typical. Typical systems base the design throughput of codec processing resource 52 upon a maximum number of audio data channels and the processing requirements of gateway-supported codecs.

The host 54, codec 52, and other gateway computing resources typically reside on one or more microprocessors within gateway 20. FIG. 2 shows codec processing resource 52 and host processing resource 54 as joined, representing a single-processor implementation where both resources share available execution slots on the processor. A multi-processor gateway implementation is depicted in FIG. 3. Host processing resource 54 comprises a general-purpose microprocessor 56, while codec processing resource 52 comprises a bank of digital signal processors (DSPs) 60, 62, 64, 66. Although four DSPs are shown in FIG. 4, systems with 16 or more such DSPs are common. Gateway 20 may additionally employ one or more processors in a data network interface 72, for the purposes of packetizing and depacketizing compressed audio data streams and communicating with packet-switched network 24 (although these functions may be implemented on one or more of the aforementioned processors, and typically are implemented on host processor 56).

In the gateway of FIG. 3, host processor 56 communicates with and controls overall execution of port 50, DSPs 60, 62, 64, 66, and data network interface 72. A control path 68 exists between host processor 56 and the DSP bank 52. This control path can be implemented as a shared memory, where processors communicate by writing into and reading from specified locations of a memory (not shown).

DSPs 60, 62, 64, and 66 also send audio data streams to and receive audio data streams from port 50 over data bus 58. With multiple audio data stream systems, each data stream typically occupies a time slot in a composite TDM data stream. To provide maximum flexibility, each DSP is capable of accessing any data stream from the composite. In a flexible system, the host processor associates new audio data streams with one of DSPs 60, 62, 64, 66 for codec processing. The associated data stream is then routed to the appropriate DSP. The associated DSP may also perform other manipulations with the data stream, such as echo suppression and voice activity detection.

A number of codecs are currently in use for Internet telephony. Most gateways offer one or more codecs that meet standards set by International Telecommunication Union (ITU). ITU Recommendation G.711 describes digital PCM audio coding with no compression. ITU Recommendation G.726 describes conversion of a 64 kbps A-law or $\mu$-law PCM data stream to a 40, 32, 24, or 16 kbps Adaptive Differential Pulse Code Modulation (ADPCM) data stream. ITU Recommendation G.728 describes coding of speech using 16 kbps Low-Delay Code Excited Linear Prediction (LD-CELP). ITU Recommendations G.729 and G.729 Annex A describe coding of speech using 8 kbps Conjugate Structure Algebraic-Code-Excited Linear Prediction (CS-ACELP). ITU Recommendation G.723.1 describes a dual rate (5.3 and 6.3 kbps) speech coder that uses a Multi-Pulse Maximum Likelihood Quantizer (MP-MLQ). These standards describe most codecs in use on gateways today.

The G.729 and G.729A coders are an example of a coder pair usable in the present invention. G.729A is essentially a reduced complexity version of G.729 coding that produces an interoperably decompressable data stream-that is, either G.729or G.729A data streams can be decompressed with a common decoder. G.729A provides somewhat lower reconstructed voice quality, but with a benefit of greatly reduced computational complexity. For example, benchmarks conducted on a Texas Instruments TMS320C542 16-bit fixed-point digital signal processor showed that a G.729-compliant coder required 20 million instructions per second (mips) throughput to code a PCM audio data stream, while a G.729A-compliant coder required only 10.5 mips throughput.

One embodiment of the present invention utilizes the general gateway architecture of FIG. 3, with a bank of 16 TMS320C542 DSPs as codec processing resource 52, each implementing G.729-compliant and G.729A-compliant coders as first and second codecs. This embodiment includes a port 50 that can handle up to 32 separate audio data streams. This embodiment can process all 32 audio data streams (two per DSP) using the G.729A-compliant coder, but can only process 16 audio data streams using the G.729-compliant coder.

In operation, the number of audio data streams handled by the gateway 20 varies as old calls are terminated and new calls are initiated through the gateway. The host processor 54 monitors the number of audio data streams handled by the gateway 20 and compares this to the available resources. Preferably, new calls are assigned to an idle DSP, if one is available, for processing with the G.729-compliant coder. If an idle DSP is not available to handle the new call, the host processor may assign the call to a DSP that is currently processing one call with the G.729A-compliant coder. In this case, the new call will be processed with the G.729A-compliant coder also.

With this embodiment, neither a full-DSP nor a half-DSP resource may be available to handle a new call if some calls are being processed with the G.729-compliant coder. In this case, the gateway may dynamically associate an existing audio data stream with a new coder. The host processor identifies an existing audio data stream that is occupying a full DSP, and instructs that DSP to switch processing of the data stream from G.729 to G.729A coding. After the DSP changes coders, a half-DSP resource then becomes available and the new call is assigned to it.

One advantage of the present invention is that no renegotiation is required between the gateway and the far end device performing decompression on the dynamically reassociated data stream. This avoids disruption of the existing call. Furthermore, some far end devices may not even support such renegotiation if such were an option. The present invention allows gateway 20 to freely reassociate data streams and codecs without addressing compatibility concerns.

One possible disadvantage of the present invention is an audible click on the line when G.729 and G.729A coders are swapped (the audio quality degradation may also be noticeable to the listener, but this cannot be helped). This click is caused by a to discontinuity due to the linear predictors in the coders. Both G.729 and G.729A compress an audio data stream, in part, by subtracting out a predictable part of an audio stream before transmission. The decoder adds the predictable part of the signal back in. If a new coder begins coding a data stream in mid-transmission, the new coder's predictive coefficients may, for a short time, mismatch with those of the decoder, producing an audible discontinuity.

The present invention includes several approaches to coping with such discontinuities. The simplest approach is the recognition that a small number of such transitions may be acceptable—thus the host processor may be constrained to perform only one dynamic reassociation on any data stream, and the listener may be forced to live with a single click. An alternative approach may be applicable if several audio data streams are available for reassociation. This approach allows the host processor to choose to reassociate the codec of a data stream with no current voice activity, thus avoiding the transmission of a transient. Finally, the new codec may be initialized with predictive values from the old codec instead of with default start-up values. Under this approach, the magnitude of any transient can be greatly reduced.

FIG. 4 illustrates one possible target capacity model for a gateway host processor utilizing the present invention. The model includes a maximum audio data stream capacity (set to eight data streams in FIG. 4), and a maximum codec processing resource throughput (set to eight processing units in FIG. 4). Each codec is modeled by the number of processing units it consumes (e.g. 1 DSP=2 processing units); codec 1 consumes two units of throughput per instance, and codec 2 consumes one unit of throughput per instance.

This capacity model attempts to maximize the number of high-quality channels, while servicing up to the maximum audio data stream capacity. Thus, as gateway traffic varies between zero and four channels, each channel will be assigned to codec 1. If a fifth channel is requested, the host processor recognizes that it must dynamically associate one of channels one through four with codec 2 in order to service the fifth channel. The addition of each successive channel causes the host processor to degrade one additional channel to codec 2, until at full channel capacity each channel is utilizing codec 2.

In order to implement the capacity model, the host processor must keep track of the current association between channels, DSP resources, and codec assignment. The host processor may use a codec vector to track association. FIG. 5 illustrates the evolution of a codec vector over time, where the vector contains four audio data channels. In the vectors of FIGS. 5 and 6, "X" represents an inactive channel, "1" represents a channel using codec 1, and "2" represents a channel using codec 2.

FIG. 5 illustrates codec vector evolution for a one-way dynamic codec reselection method, where, as in preceding examples, half the channels may be processed with codec 1, and all the channels may be processed with codec 2. As new calls are added at time slots T1 and T2, each is assigned to codec 1. These calls are dynamically reassociated with codec 2, one by one as needed, during time slots T3 and T4 as new calls arrive, while the new calls arriving at T3 and T4 are associated with codec 2. At time slots T5 and T6, calls are dropped and excess capacity exists. However, because reselection is one-way, channels 3 and 4 continue to use codec 2. When a new call is added at time slot T7, it uses the available capacity and is associated with codec 1.

FIG. 6 illustrates this evolution for a two-way dynamic codec reselection method. This method allows calls to return to an association with codec 1 as calls are dropped at T5 and T6, resulting in better overall utilization of throughput to deliver quality audio to the most channels possible. One drawback of this method is that a single continuing call may experience multiple shifts in quality (and possibly "clicks" also). One other side effect of this general method is that new calls may never be associated with codec 1 if the system is half-loaded or more.

Whether one-way, two-way, or some hybrid codec association is performed by the host processor, additional criteria may be used to select one of several candidate channels for codec reselection. One such criteria is a simple round-robin approach. New calls are added to the bottom of a reselection list, and reselection is performed on the call at the top of the list. Calls are removed from the list if they terminate before reaching the top. This sort of criteria implicitly implements a length-of-connection ranking, although such a ranking can be explictly employed if connection times are available to the host processor (as they may be for billing purposes).

A second possible criteria is quality of service (QoS). Some users may pay more for service guarantees that would let them be last to be downgraded, or first to be upgraded. It may also be possible to totally exempt a class of service from codec reselection—in essence, those paying for this QoS would be paying for the right to occupy more than minimal processing resources during heavy traffic periods. Somewhere between these extremes, a class of service may include a codec pair that produces a less distinctive degradation due to reselection than the codec pair used for another class of service.

A further selection criteria may be the number of times a channel has already reselected codecs. This information may be tagged within a codec vector. It may also appear implicitly in a double round-robin approach. In this approach, new calls are added to the bottom of a downgrade reselection list or an upgrade reselection list, depending on their initial codec. If the calls reach the top of their list and are dynamically reselected, they are moved to the bottom of the opposing list. Calls being reselected a preset maximum number of times, or reaching a maximum reselect frequency, may also be exempted from the reselection process.

Finally, as mentioned previously, the host processor may use as a primary or secondary selection criteria the presence of voice activity at the time of reselection.

Although the preferred embodiments have been described with reference to a pair of codecs, the invention extends naturally to a three-or-greater interoperably decompressable codec selection set. As individual processors are used to compress greater numbers of channels, finer processing distinctions between codecs become implementable. Processing ratios between the codecs need not be two-to-one; in practice, any characterizable processing ratio may be included in a throughput model. Due to QoS, compatibility with far-end equipment, or other constraints, different channels may be assigned to different codec sets with reselection for that channel using codecs from the assigned set. The codec processing resource may be loaded with fax, modem, or other processing tasks in addition to audio codec processing; such variable-codec-processing-resource embodiments remain within the scope of the invention. In some cases, for instance, a new fax processing task may require codec reselection on an audio channel in order to provide processing resources.

Although specific embodiments described herein use the G.729 and G.729A codecs as a codec set, this was done merely because specifications for these codecs are standardized. One of ordinary skill can manipulate other known codec algorithms to remove computations and create a lower audio quality algorithm that generates interoperably decompressable data.

The reselection process may result in no reselection at some call add/drop points. The present invention does not require that an existing call be shifted to an alternate codec every time a call is added or dropped—only that the host processor consider this possibility, and whether it is warranted by current conditions.

Other modifications to the disclosed embodiments will be obvious to those of ordinary skill in the art upon reading this disclosure, and are intended to fall within the scope of the invention as claimed.

What is claimed is:

1. A packet-switched network telephony gateway comprising:
   a port for sending audio data streams to and receiving audio data streams from a first network, said port having a maximum audio data stream capacity of at least two data streams;
   a packet switched network interface for formatting the audio data streams into packets for sending over a packet switched network and unformatting packets received from the packet switched network back into the audio data streams;
   a host processing resource that monitors the number of audio data streams currently handled by the gateway from the first network and the packet switched network and dynamically associates audio data streams received through said port with a codec selected from a set consisting of a first codec and at least one alternate codec that produce interoperably decompressable data streams; and a codec processing resource that compresses the audio data streams using the codec currently selected by the host processing resource for that audio data stream, the packet switched network interface packetizing and unpacketizing the compressed audio data streams.

2. The gateway of claim 1, wherein said first network is a circuit-switched network.

3. The gateway of claim 1, wherein said codec processing resource has throughput sufficient to perform real-time data compression using said first codec on only a subset of the maximum audio data stream capacity of said port, but sufficient to perform real-time data compression using said at least one alternate codec on the entire maximum audio data stream capacity of said port.

4. The gateway of claim 1, wherein said host processing resource changes the codec associated with any particular audio data stream depending upon a number of times the host processing resource has previously changed the codec for the audio data stream.

5. The gateway of claim 1, wherein said host processing resource changes the codec associated with any particular audio data stream depending upon whether that particular audio data stream has any current voice activity.

6. The gateway of claim 1, wherein said host processing resource comprises a first microprocessor and said codec processing resource comprises a second microprocessor connected to and controlled by said first microprocessor.

7. The gateway of claim 6, wherein said codec processing resource further comprises a third microprocessor connected to and controlled by said first microprocessor, and wherein said second and third microprocessors receive audio data streams from said port.

8. The gateway of claim 7, wherein said second and third microprocessors can each access any audio data stream received from said port.

9. The gateway of claim 1, wherein said host processing resource changes the codec associated with any particular audio data stream according to a quality of service associated with the packet switched network.

10. The gateway of claim 1, wherein said first codec and said at least one alternate codec both comprise linear predictive audio data compressors operating at a common output data rate, and wherein said first codec requires at least 50% greater average processing time than said second codec.

11. The gateway of claim 10, wherein said audio data compressors both comprise conjugate structure algebraic code excited linear predictive audio data compressors.

12. A packet-switched network telephony gateway comprising:

a port for sending audio data streams to and receiving audio data streams from a circuit-switched network, said port having a maximum audio data stream capacity of at least two data streams;

at least two digital signal processors;

a time-division-multiplexed data bus connected between said port and said digital signal processors, allowing any one of said digital signal processors to access any audio data stream received through said port;

a packet switched network interface for packetizing and depacketing the data streams for communicating over a packet switched network; and a host processor that monitors the number of audio data streams handled by the gateway, associates each new audio data stream received through said port with one of said digital signal processors for compression, and dynamically associates each audio data stream received through said port with a codec selected from the set consisting of a first codec and a second codec that produce interoperably decompressable data streams according to a number of active audio channels established over the packet switched network.

13. The gateway of claim 12, wherein said at least two digital signal processors have a combined throughput sufficient to perform real-time data compression using said first codec on only a subset of the maximum audio data stream capacity of said port, but sufficient to perform real-time data compression using said at least one alternate codec on the entire maximum audio data stream capacity of said port.

14. The gateway of claim 12, wherein said host processor changes the codec associated with any particular audio data stream according to a number of times the host processor has previously changed the codec associated with the audio data stream.

15. The gateway of claim 12 wherein the host processor changes the codec associated with any particular audio data stream depending upon whether that particular audio data stream has any current voice activity.

16. The gateway of claim 12 wherein the host processor changes the codec associated with any particular audio data stream according to a quality of service associated with the packet switched network.

17. A system comprising:

means for sending audio data streams to and receiving audio data streams from a packet switched network through a port having a maximum audio data stream capacity of at least two data streams;

means for monitoring the number of audio data streams currently handled by the port and dynamically associating audio data streams received through said port with a codec selected from a set consisting of a first codec and at least one alternate codec that produce interoperably decompressable data streams according to the number of audio data streams on the packet switched network handled by the port;

means for compressing each audio data stream using the codec currently selected for that audio data stream; and means for packetizing and depacketing the compressed audio data stream.

18. The system of claim 17 including means for changing the codec associated with any particular audio data stream according to a number of times the host processing resource has previously changed the codec for the audio data stream.

19. The system of claim 17 including means for changing the codec associated with any particular audio data stream depending upon whether that particular audio data stream has any current voice activity.

20. The system of claim 17 including means for changing the codec associated with any particular audio data stream according to a quality of service associated with the packet switched network.

21. An electronic storage medium containing software used for processing audio data streams, comprising:

code for sending audio data streams to and receiving audio data streams from a packet switched network through a port having a maximum audio data stream capacity of at least two data streams;

code for monitoring the number of audio data streams currently handled by the port and dynamically associating audio data streams received through said port with a codec selected from a set consisting of a first codec and at least one alternate codec that produce interoperably decompressable data streams according to the number of audio data streams on the packet switched network handled by the port;

code for compressing each audio data stream using the codec currently selected for that audio data stream; and code for packetizing and depacketing the compressed audio data stream.

22. The electronic storage medium of claim 21 including code for changing the codec associated with any particular audio data stream according to a number of times the host processing resource has previously changed the codec for the audio data stream.

23. The electronic storage medium of claim 21 including code for changing the codec associated with any particular audio data stream depending upon whether that particular audio data stream has any current voice activity.

24. The electronic storage medium of claim 21 including code for changing the codec associated with any particular audio data stream according to a quality of service associated with the packet switched network.

* * * * *